US012339624B2

(12) United States Patent
Zaugg

(10) Patent No.: US 12,339,624 B2
(45) Date of Patent: Jun. 24, 2025

(54) HOROLOGICAL MOVEMENT COMPRISING A STOP-SECONDS FUNCTION THAT CAN BE OPERATED FROM TWO SEPARATE ACTUATING MEMBERS

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 438 days.

(21) Appl. No.: 17/965,287

(22) Filed: Oct. 13, 2022

(65) Prior Publication Data

US 2023/0205138 A1 Jun. 29, 2023

(30) Foreign Application Priority Data

Dec. 23, 2021 (EP) .................................... 21217365

(51) Int. Cl.
*G04B 19/02* (2006.01)
*G04B 27/00* (2006.01)

(52) U.S. Cl.
CPC ........... *G04B 19/02* (2013.01); *G04B 27/001* (2013.01); *G04B 27/004* (2013.01)

(58) Field of Classification Search
CPC ........ G04B 19/02; G04B 19/25; G04B 27/00; G04B 27/001; G04B 27/004
See application file for complete search history.

(56) References Cited

U.S. PATENT DOCUMENTS 7,232,254 B2 * 6/2007 Forsey .................. G04F 7/0838 368/110
7,445,374 B2 * 11/2008 Forsey .................. G04F 7/0866 368/110
8,834,017 B2 * 9/2014 Farron .................. G04F 7/0842 368/37
8,923,096 B1 * 12/2014 Stotz ......................... G04F 8/02 368/110
9,128,466 B2 * 9/2015 Monferrer ............ G04B 27/002

FOREIGN PATENT DOCUMENTS

CH 698 878 B1 11/2009
EP 3 407 142 B1 1/2020

OTHER PUBLICATIONS

European Search Report for 21 21 7365 dated, Jun. 21, 2022.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A horological movement including a seconds wheel set, a power source, and a regulator (13) to regulate the motion of the seconds wheel set. The movement includes a control mechanism (20) to take an active state wherein it cooperates with the regulator (13) to immobilise it and with the seconds wheel set for driving it such that it rotates into a predefined position. The control mechanism (20) is adapted to take an inactive state wherein it releases the regulator (13) such that the latter is able to regulate the motion of the seconds wheel set, and the seconds wheel set so as to authorise the displacement thereof. The mechanism (20) includes two motion transmitting modules, each to be connected to a specific actuating member, and each being driving the control mechanism (20) between the inactive state and active state upon operation of the actuating member to which it is connected.

14 Claims, 2 Drawing Sheets

HOROLOGICAL MOVEMENT COMPRISING A STOP-SECONDS FUNCTION THAT CAN BE OPERATED FROM TWO SEPARATE ACTUATING MEMBERS

CROSS REFERENCE TO RELATED APPLICATION

The present application is based on, and claims priority from the prior European Patent Application No. 21217368.6, filed on Dec. 23, 2021, the entire contents of which are incorporated herein by reference.

TECHNICAL FIELD OF THE INVENTION

The invention relates to the field of horology, and in particular that of horological movements.

More particularly, the invention relates to a horological movement including a "stop-seconds" function that can be operated from two separate actuating members.

TECHNOLOGICAL BACKGROUND

The "stop seconds" function is a well-known horological complication and allows the seconds display to be immobilised in order to set the hands on a watch more accurately.

This function is implemented by immobilising the regulator of the watch by means of an adapted stop mechanism, after a user has operated a crown of the watch. Once the hands have been set on the watch, the regulator is released by operating the crown again.

In certain horological movements of the prior art, the "stop seconds" function is associated with a setting of the seconds display to a reference position, the reference position generally corresponding to the zero position, i.e. 12:00.

The combination of these functions allows the hands to be set even more accurately.

There is, however, a need, in certain applications, that is not fulfilled by the devices in the prior art, for a watch wherein the stop seconds and seconds display reset functions can be implemented by separate means and in as simple a design as possible.

SUMMARY OF THE INVENTION

The invention overcomes the aforementioned drawbacks.

To this end, the present invention relates to a horological movement comprising a wheel set of a time value display, such as a seconds wheel set, a power source connected to this wheel set of a display for driving it such that it rotates, and a regulator intended to regulate the motion of this wheel set of a display, said horological movement comprising a control mechanism adapted to take an active state wherein it cooperates with the regulator to immobilise it, and an inactive state wherein it releases the regulator such that the latter is able to regulate the motion of the wheel set of a time value display.

The control mechanism includes two motion transmitting modules, each intended to be connected to an actuating member specific thereto, each of said modules being configured to drive the control mechanism between the inactive state thereof and the active state thereof upon operation of the actuating member to which it is connected.

In specific embodiments, the invention can further include one or more of the following features, which must be considered singly or according to any combinations technically possible.

In specific embodiments, the control mechanism is adapted to take an active state wherein it cooperates with the wheel set of a time value display to drive it such that it rotates into a predefined position, and an inactive state wherein it releases the wheel set of a time value display so as to allow the displacement thereof.

In specific embodiments, the control mechanism includes:

- a stop lever arranged such that it can move in rotation and taking an active position wherein it rests such that it bears against the regulator when the control mechanism is in the active state;
- a transmitting yoke carrying a planetary yoke configured to connect the transmitting modules with the stop lever and to take an active position, when the control mechanism is in the active state, wherein said planetary yoke drives said stop lever into the active position thereof.

In specific embodiments, the control mechanism includes a hammer arranged such that it can rotate, the planetary yoke being configured to connect the transmitting modules and the hammer such that said hammer takes an active position wherein it rests such that it bears against a heart cam integral with the wheel set of a time value display when the planetary yoke is in the active position.

In specific embodiments, the stop lever, the hammer and the transmitting yoke are capable of moving in rotation about the same axis of rotation.

In specific embodiments, the hammer and the stop lever are biased into the respective active position thereof by a spring and arranged to abut against a retaining element of the planetary yoke.

In specific embodiments, one of the transmitting modules, referred to as the "first transmitting module", includes a transmitting lever extending between two ends, said lever being capable of moving in rotation at one of the ends thereof and comprising, at the other end, a protrusion by means whereof it cooperates with the transmitting yoke so as to drive it such that it rotates when it is operated by one of the actuating members, referred to as the "first actuating member", to which it is connected.

In specific embodiments, the transmitting lever is arranged to bear against an arm of the transmitting yoke such that it opposes the force exerted by the spring tending to drive said stop lever and said hammer into the active position thereof.

In specific embodiments, one of the transmitting modules, referred to as the "second transmitting module", includes a connecting yoke intended to be connected to one of the actuating members, referred to as the "second actuating member", the connecting yoke and the planetary yoke being connected to one another by a connecting rod, such that the operation of the second actuating member causes the planetary yoke to rotate.

In specific embodiments, the connecting rod is attached to a first flange of the planetary yoke, said first flange being opposite a second flange comprising the retaining element against which the hammer and the stop lever are arranged to bear.

In specific embodiments, the stop lever and the hammer are arranged to bear against a pin extending from a surface of the second flange of the planetary yoke, said pin being arranged to form the retaining element.

In specific embodiments, the pin is engaged in a cavity in the stop lever, with the spring being arranged to bear against the hammer only.

According to another object, the present invention relates to a watch comprising a horological movement as described hereinabove, and wherein the actuating members are constituted by a crown and by a push-piece.

In specific embodiments of the invention, the push-piece is adapted to cooperate with an actuator of a sympathetic clock, so as to act on the transmitting module with which it is connected upon the operation of said actuator.

BRIEF DESCRIPTION OF THE FIGURES

Other features and advantages of the invention will be better understood upon reading the following detailed description, which is given as a rough guide and in no way as a limiting guide, with reference to the accompanying drawings, in which.

DETAILED DESCRIPTION OF THE INVENTION

Figure 1:
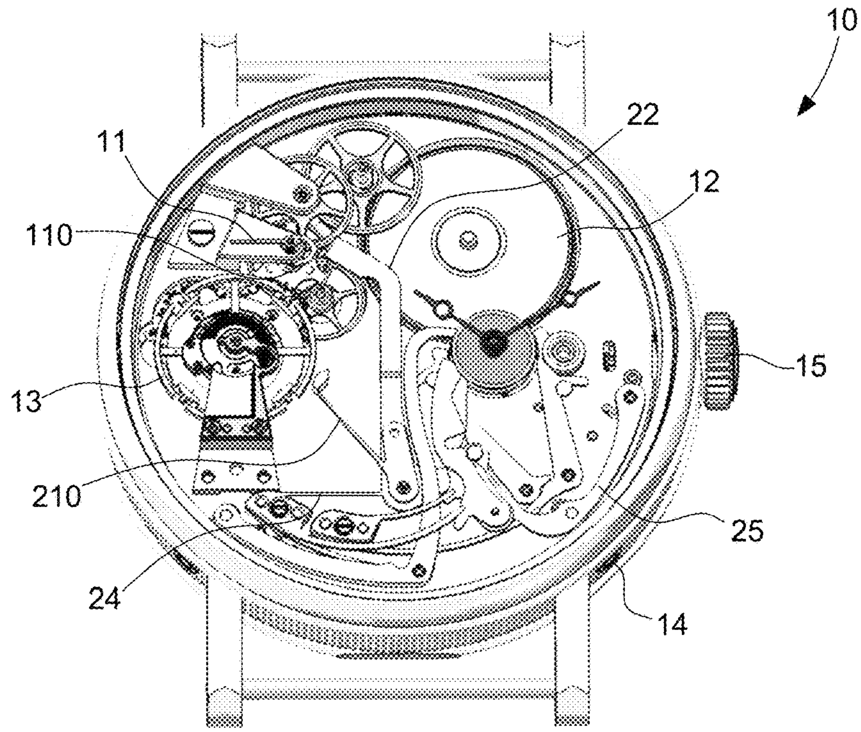
FIG. 1 diagrammatically shows a front view of a watch comprising a horological movement according to one example embodiment of the present invention.
Figure 2:
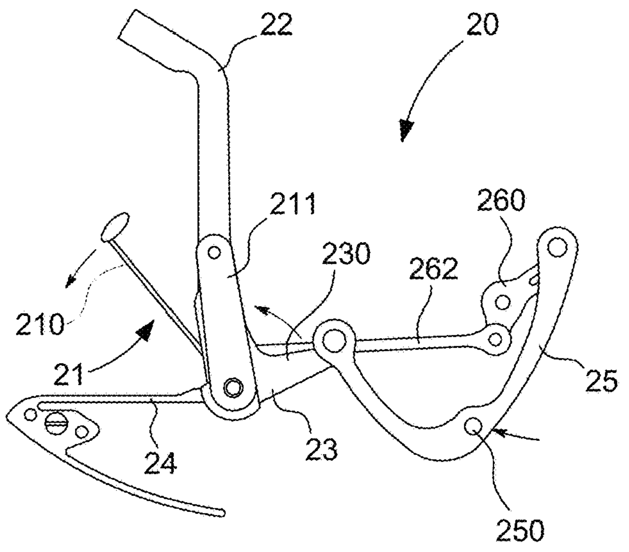
FIG. 2 shows a front view of a control mechanism of the horological movement in FIG. 1.

The present invention relates to a watch 10 comprising a horological movement with a "stop seconds" function as diagrammatically shown in FIG. 1. It should be noted that the watch 10, in a preferred application of the present invention, is a sympathetic watch intended to cooperate with a sympathetic clock.

The horological movement according to the present invention comprises a wheel set of a time value display, such as a seconds wheel set, intended to carry a seconds display 11, such as a seconds hand.

The horological movement further comprises a power source, such as a barrel 12, connected to the seconds wheel set to drive it such that it rotates, in a manner known to a person skilled in the art, and a regulator 13 intended to regulate the motion of the seconds wheel set, as seen in FIG. 1.

The horological movement further comprises a control mechanism 20, as shown in FIGS. 2 to 6, adapted to take an active state wherein it cooperates, on the one hand, with the regulator 13 to immobilise it and, on the other hand, with the seconds wheel set to drive it such that it rotates into a predefined position. The control mechanism 20 is further adapted to take an inactive state wherein it releases, on the one hand, the regulator 13 so that the latter is able to regulate the motion of the seconds wheel set, and on the other hand, the seconds wheel set so as to authorise the displacement thereof.

Advantageously, the control mechanism 20 includes two motion-transmitting modules, each intended to be connected to an actuating member specific thereto, both of said transmitting modules being configured to drive the control mechanism 20 between the inactive state thereof and the active state thereof, upon operation of the actuating member to which they are connected.

More particularly, the control mechanism 20 includes a stop lever 21 arranged such that it can move in rotation and taking an active position wherein it rests such that it bears against the regulator 13 when the control mechanism 20 is in the active state. More specifically, as shown in FIGS. 1 to 6, the stop lever 21 comprises a bearing arm 210 intended to rest such that it bears, via the free end thereof, against a balance of the regulator 13, and a transmitting arm 211 intended to receive forces driving the displacement of the stop lever 21.

The control mechanism 20 further includes a hammer 22 arranged such that it can move in rotation and taking an active position wherein it rests such that it bears against a heart cam 110 integral with the seconds wheel set when the control mechanism 20 is in the active state.

Furthermore, the control mechanism 20 comprises a transmitting yoke 23 carrying a planetary yoke 261 configured to connect the transmitting modules with the stop lever 21 and the hammer 22, and so as to take an active position when the control mechanism 20 takes the active state wherein said yoke drives said stop lever 21 and said hammer 22 into the active position thereof. In other words, when one of the actuating members is operated, it causes the displacement of transmitting module to which it is connected, and drives the stop lever 21 and the hammer 22 via the yoke of the planetary yoke 261.

The planetary yoke 261 is attached such that it can move in rotation on the transmitting yoke 23.

Preferably, as shown in FIGS. 1 to 6, the stop lever 21, the hammer 22 and the transmitting yoke 23 are capable of moving in rotation about the same axis of rotation. This feature advantageously simplifies the control mechanism 20.

The control mechanism 20 comprises a spring 24 for biasing the control mechanism 20 into the active state thereof. More specifically, the spring 24 is configured to bias the hammer 22 and the stop lever 21 into the respective active position thereof, the latter being arranged to abut against a retaining element carried by the planetary yoke 261. In other words, the spring 24 applies a return force to the hammer 22, which transmits it to the stop lever 21 and to the transmitting yoke 23 via the retaining element.

Furthermore, in these example embodiments of the invention, the hammer 22 is interposed between the stop lever 21 and the transmitting yoke 23.

One of the transmitting modules, referred to as the "first transmitting module", includes a transmitting lever 25 extending between two ends and being connected to one of the actuating members, referred to as the "first actuating member", at a pivot 250 arranged between said ends. It should be noted that the features of the first transmitting module are identical in the two example embodiments of the invention shown in the figures.

The first actuating member is preferably formed by an actuator of the watch 10, such as a push-piece 14, adapted to cooperate with an actuator of a sympathetic clock. These actuators are not described in more detail herein as they are not as such the object of the present invention.

The transmitting lever 25 is capable of moving in rotation at one of the ends thereof and comprises, at the other end thereof, a protrusion 251 via which it cooperates with the transmitting yoke 23 so as to drive it such that it rotates when it is operated by the first actuating member. The protrusion 251 can take the form of a pin and bears, as shown in the figures, on one of the arms, referred to as the "first arm" 230, of the transmitting yoke 23 so as to oppose the force exerted by the spring 24 tending to drive said stop lever 21 and said hammer 22 into the active position thereof.

In the example embodiments of the invention shown in the figures, the other transmitting module, referred to as the "second transmitting module", is arranged opposite the first transmitting module with respect to the transmitting yoke 23, the hammer 22 and the stop lever 21. In other words, the transmitting yoke 23, the hammer 22 and the stop lever 21 are interposed between the two transmitting modules.

Figure 3:
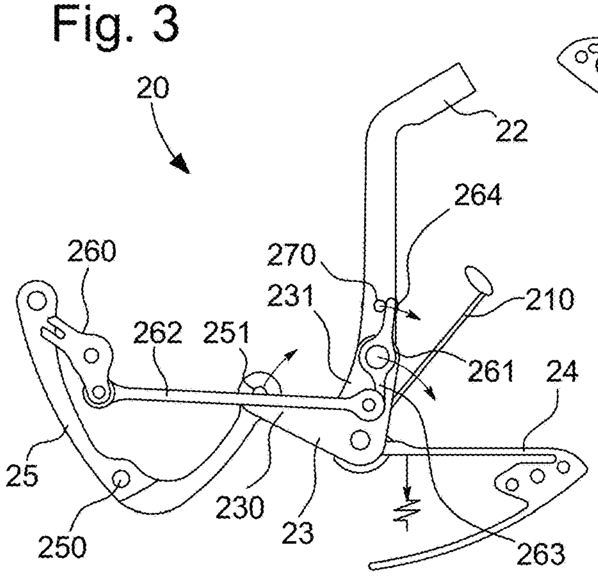
FIG. 3 shows a rear view of the control mechanism of the horological movement in FIG. 2.
Figure 5:
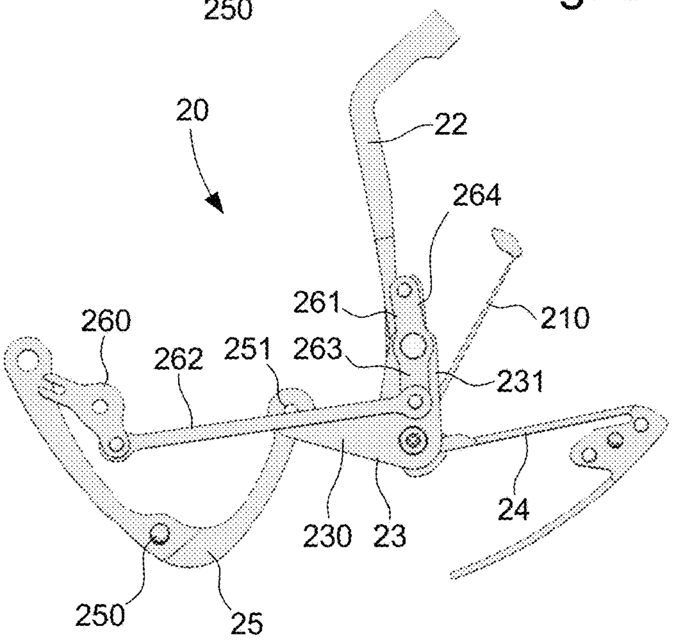
FIG. 5 shows a rear view of the control mechanism of the horological movement in FIG. 4.

As shown in FIGS. 3 and 5, the second transmitting module includes a connecting yoke 260 intended to be connected to one of the actuating members, referred to as the "second actuating member". The connecting yoke 260 and the planetary yoke 261 are connected to one another by a connecting rod 262, said connecting rod 262 allowing a motion of the connecting yoke 260 generated by the operation of the second actuating member to be transmitted to the planetary yoke 261.

The second actuating member is preferably formed by a crown 15 of the watch 10, intended to be handled by the user of said watch 10. In a manner known per se, the crown 15 can be connected, by a stem capable of moving in translation, to a pull-out piece, not shown in the figures. The pull-out piece is advantageously configured to transmit a rotational motion to the connecting yoke 260 following a translation of the crown 15. For example, the pull-out piece can be connected to the connecting yoke 260 by a pivot.

The planetary yoke 261 is arranged to cooperate with the hammer 22 and the stop lever 21 such that, when the second actuating member is operated so as to drive the control mechanism 20 into the inactive state thereof, it opposes the force exerted by the spring 24 tending to drive said stop lever 21 and said hammer 22 into the inactive position thereof, without causing the transmitting yoke 23 to rotate.

Conversely, the planetary yoke 261 is arranged to cooperate with the hammer 22 and the stop lever 21 such that, when the second actuating member is operated to drive the control mechanism 20 into the active state thereof, it allows said stop lever 21 and said hammer 22 to be released into the active position thereof under the effect of the force exerted by the spring 24, without causing the transmitting yoke 23 to rotate.

More specifically, in the example embodiments shown in FIGS. 2 to 6, the planetary yoke 261 is attached such that it can move in rotation, for example similarly to a planetary wheel set, on the transmitting yoke 23, and more particularly on one of the arms thereof, referred to as the "second arm" 231.

To summarise, the two transmitting modules are connected to the hammer 22 and to the stop lever 21 by the transmitting yoke 23 and by the planetary yoke 261, for example similarly to a differential gear.

Figure 4:
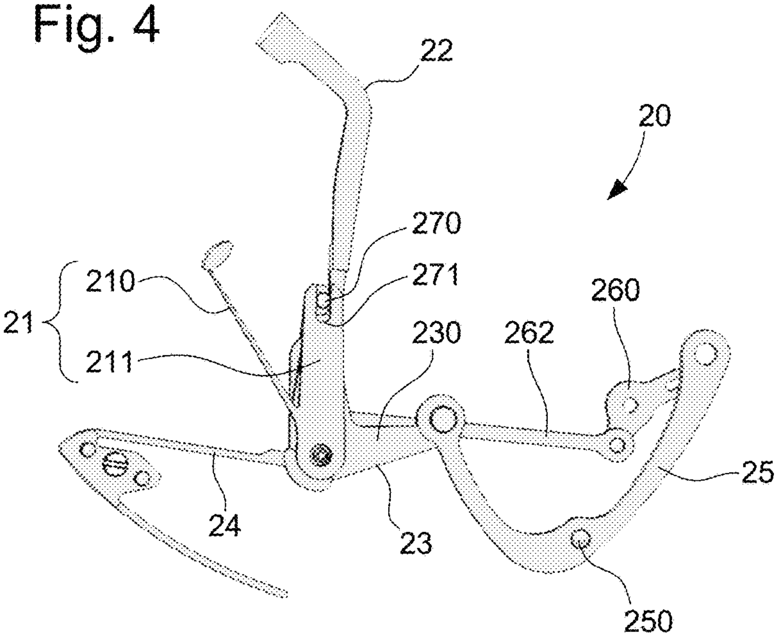
FIG. 4 shows a front view of the control mechanism of the horological movement according to another example embodiment of the present invention.

Advantageously, as shown in FIGS. 3 to 5, the connecting rod 262 is hinged to a first flange 263 of the planetary yoke 261, said first flange 263 being opposite a second flange 264 comprising the retaining element against which the hammer 22 and the stop lever 21 are arranged to bear.

It is understood here that the operation of the transmitting lever 25 by the first actuating member, so as to release the control mechanism 20 into the active state thereof, releases said lever to undergo an angular displacement in a first direction of rotation allowing the transmitting yoke 23 to rotate under the effect of the force generated by the spring 24, said force being transmitted to said transmitting yoke 23 by the bearing of the hammer 22 on the second flange 264 of the planetary yoke 261.

In other words, the first actuating member is arranged to cause the transmitting yoke 23 to pivot, whereas the connecting rod 262 and the connecting yoke 260 are stationary, thereby restricting the rotation of the planetary yoke 261 relative to the end of the connecting rod 262 to which the first flange 263 is connected, and driving the hammer 22 and the stop lever 21 via the pin 270.

Conversely, the operation of the transmitting lever 25 by the first actuating member, so as to drive the control mechanism 20 into the inactive state thereof, restricts said lever to an angular displacement in a second direction of rotation resulting in the rotation of the transmitting yoke 23 against the force generated by the spring 24, said force being transmitted to said transmitting yoke 23 by the bearing of the hammer 22 on the second flange 264 of the planetary yoke 261.

Furthermore, the operation of the connecting yoke 260 by the second actuating member, so as to drive the control mechanism 20 into the active state, releases the pivoting, relative to the transmitting yoke 23 and in a first direction of rotation, of the planetary yoke 261 by means of the connecting rod 262, allowing the rotation of the hammer 22 and the stop lever 21 to be released under the effect of the force generated by the spring 24.

In other words, the second actuating member is arranged to cause the connecting yoke 260 to pivot, whereas the transmitting lever 25 and the transmitting yoke 23 are stationary, thereby restricting the rotation of the planetary yoke 261 relative to the transmitting yoke 23, and driving the hammer 22 and the stop lever 21 via the pin 270.

Conversely, the operation of the connecting yoke 260 by the second actuating member, so as to drive the control mechanism 20 into the inactive state, restricts the pivoting, relative to the transmitting yoke 23 and in a second direction of rotation, of the planetary yoke 261 by means of the connecting rod 262, driving the rotation of the hammer 22 and the stop lever 21 against the force generated by the spring 24.

Figure 6:
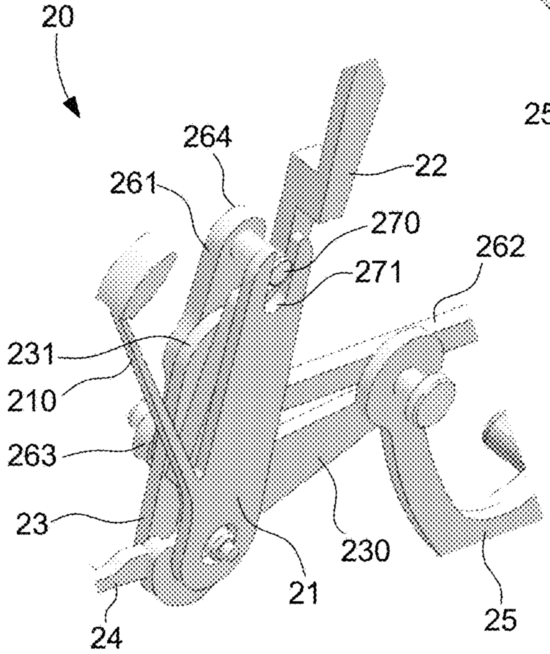
FIG. 6 shows a perspective view of a feature of the control mechanism of the horological movement shown in FIGS. 4 and 5.

In particular, in the example embodiment shown in FIGS. 4 to 6, the retaining element is formed by a pin 270 extending from a surface of the second flange 264 of the planetary yoke 261 and engaging within a cavity 271 comprised in the transmitting arm 211 of the stop lever 21.

More specifically, as shown in detail in FIG. 6, in this example embodiment, the cavity 271 is oblong in shape so as to allow the pin 270 to slide within said cavity 271. Such a translation is caused, for example, when the planetary yoke 261 is driven such that it rotates relative to the transmitting yoke 23 when operated by the second actuating member.

It should be noted that the cavity, in other example embodiments, can be provided on a second flange 264 of the planetary yoke 261 and that the pin 270 can extend from a surface of the transmitting arm 211 of the stop lever 21.

Generally speaking, it should be noted that the example embodiments considered hereinabove have been described by way of non-limiting examples, and other alternative embodiments can thus be envisaged.

In particular, the first and second actuating members can be formed by any suitable element, such as a bezel, a push-piece, or a lever, etc.

Furthermore, the disposition of the hammer 22 and of the stop lever 21 can be reversed in the sense that the stop lever 21 can be interposed between the hammer 22 and the transmitting yoke 23, whereby the pin is thus engaged within a cavity made in the hammer 22 and the spring 24 bears against the stop lever 21.

The invention claimed is:

1. A horological movement comprising:

a wheel set of a time value display (11);

a power source connected to this wheel set of a display for driving the wheel set to rotate;

a regulator (13) configured to regulate the motion of this wheel set of a display; and a control mechanism (20) adapted to take an active state wherein the control mechanism cooperates with the regulator (13) to immobilise the regulator, and an inactive state wherein the control mechanism releases the regulator (13) such that the regulator is able to regulate the motion of the wheel set of a time value display (11), wherein the control mechanism (20) includes two motion transmitting modules, each intended to be connected to an actuating member specific thereto, each of said modules being configured to drive the control mechanism (20) between the inactive state thereof and the active state thereof upon operation of the actuating member to which it is connected.

2. The horological movement according to claim 1, wherein the control mechanism (20) is adapted to take an active state wherein it cooperates with the wheel set of a time value display (11) to drive it such that it rotates into a predefined position, and an inactive state wherein it releases said wheel set so as to allow the displacement thereof.

3. The horological movement according to claim 1, wherein the control mechanism (20) includes:

a stop lever (21) arranged such that it can move in rotation and taking an active position wherein it rests such that it bears against the regulator (13) when the control mechanism (20) is in the active state;

a transmitting yoke (23) carrying a planetary yoke (261) configured to connect the transmitting modules with the stop lever (21) and to take an active position, when the control mechanism (20) is in the active state, wherein said planetary yoke (261) drives said stop lever (21) into the active position thereof.

4. The horological movement according to claim 3, wherein the control mechanism (20) is adapted to take an active state wherein it cooperates with the wheel set of a time value display (11) to drive it such that it rotates into a predefined position, and an inactive state wherein it releases said wheel set so as to allow the displacement thereof, the control mechanism (20) including a hammer (22) arranged such that it can rotate, the planetary yoke (261) being configured to connect the transmitting modules and the hammer (22) such that said hammer (22) takes an active position wherein it rests such that it bears against a heart cam (110) integral with the wheel set of a time value display (11) when the planetary yoke (261) is in the active position.

5. The horological movement according to claim 4, wherein the stop lever (21), the hammer (22) and the transmitting yoke (23) are capable of moving in rotation about the same axis of rotation.

6. The horological movement according to claim 4, wherein the hammer (22) and the stop lever (21) are biased into the respective active position thereof by a spring (24) and arranged to abut against a retaining element of the planetary yoke (261).

7. The horological movement according to claim 3, wherein one of the transmitting modules, referred to as the "first transmitting module", includes a transmitting lever (25) extending between two ends, said lever being capable of moving in rotation at one of the ends thereof and comprising, at the other end, a protrusion (251) by means whereof it cooperates with the transmitting yoke (23) so as to drive it such that it rotates when it is operated by one of the actuating members, referred to as the "first actuating member", to which it is connected.

8. The horological movement according to claim 7, wherein the hammer (22) and the stop lever (21) are biased into the respective active position thereof by a spring (24) and arranged to abut against a retaining element of the planetary yoke (261), the transmitting lever (25) being arranged to bear against an arm (230) of the transmitting yoke (23) such that it opposes the force exerted by the spring (24) tending to drive said stop lever (21) and said hammer (22) into the active position thereof.

9. The horological movement according to claim 3, wherein one of the transmitting modules, referred to as the "second transmitting module", includes a connecting yoke (260) intended to be connected to one of the actuating members, referred to as the "second actuating member", the connecting yoke (260) and the planetary yoke (261) being connected to one another by a connecting rod (262), such that the operation of the second actuating member causes the planetary yoke (261) to rotate.

10. The horological movement according to claim 9, wherein the hammer (22) and the stop lever (21) are biased into the respective active position thereof by a spring (24) and arranged to abut against a retaining element of the planetary yoke (261), the connecting rod (262) being attached to a first flange (263) of the planetary yoke (261), said first flange (263) being opposite a second flange (264) comprising the retaining element against which the hammer (22) and the stop lever (21) are arranged to bear.

11. The horological movement according to claim 10, wherein the stop lever (21) and the hammer (22) are arranged to bear against a pin (270) extending from a surface of the second flange (264) of the planetary yoke (261), said pin (270) being arranged to form the retaining element.

12. The horological movement according to claim 11, wherein the pin (270) is engaged in a cavity (271) in the stop lever (21), with the spring (24) being arranged to bear against the hammer (22) only.

13. A watch (10) comprising a horological movement according to claim 1, characterised in that the actuating members are formed by a crown (15) and by a push-piece (14).

14. The watch (10) according to claim 13, wherein the push-piece (14) is adapted to cooperate with an actuator of a sympathetic clock, so as to act on the transmitting module with which it is connected, upon the operation of said actuator.

* * * * *